E. EINFELDT.
MACHINE FOR MAKING METAL TIRES.
APPLICATION FILED JUNE 22, 1909. RENEWED SEPT. 10, 1913.

1,092,478.

Patented Apr. 7, 1914.
5 SHEETS—SHEET 3.

Witnesses

Inventor
Emil Einfeldt
By P. F. Dodge
Attorney

E. EINFELDT.
MACHINE FOR MAKING METAL TIRES.
APPLICATION FILED JUNE 22, 1909. RENEWED SEPT. 10, 1913.

1,092,478.

Patented Apr. 7, 1914.

UNITED STATES PATENT OFFICE.

EMIL EINFELDT, OF DAVENPORT, IOWA, ASSIGNOR, BY MESNE ASSIGNMENTS, TO G. WATSON FRENCH, NATHANIEL FRENCH, AND JOSEPH L. HECHT, ALL OF DAVENPORT, IOWA, A FIRM.

MACHINE FOR MAKING METAL TIRES.

1,092,478.  Specification of Letters Patent.  Patented Apr. 7, 1914.

Application filed June 22, 1909, Serial No. 503,737. Renewed September 10, 1913. Serial No. 789,170.

*To all whom it may concern:*

Be it known that I, EMIL EINFELDT, of Davenport, county of Scott, and State of Iowa, have invented a new and useful Improvement in Machines for Making Metal Tires, of which the following is a specification.

The object of the invention is to provide mechanism by means of which wheel tires may be produced of true circular form, and of the exact diameter required; and the invention consists primarily of a clamping and holding device of improved form and construction, adapted to grasp the tire blank at a plurality of points after it has been approximately shaped and before its ends are joined, and acting to bring the same to its final and predetermined true circular form; whereby the ends of the tire may be connected together when so held, and its change of form or deformation after connection prevented.

The invention consists also in combination with a clamping and holding device of this character, of means for supporting and heating the open ends of the tire, and means for actuating the clamping device to grasp the heated tire held by the supporting means.

The invention consists further in combination with a tire supporting and heating means, and a clamping and holding device for the tire, of means for welding or finishing the heated ends of the tire, and means for moving the clamping and holding device to grasp the heated tire, and present the latter to be operated on by the finishing means.

The invention consists also in various details of construction and combination of parts which will be fully described in the specification, and the novel features of which will be pointed out in the claims.

In the accompanying drawings.

Referring to the accompanying drawings, which illustrate one embodiment of my invention, the improved mechanism comprises tire heating means X; tire clamping and holding device Y; and tire finishing or welding mechanism Z, which latter may be operated either to weld the ends of the tire, or to shape up and finish a weld previously partially effected by the action of the clamping mechanism on the heated tire, as will be more fully described hereinafter.

In the present case a plurality of heating means are provided, in the form of muffle furnaces, each comprising an upper member 1 and a lower member 2, which members are movable relatively to each other to permit the tire to be easily introduced and removed. For this purpose the upper member of each furnace is mounted on an arm 3 fixed to a horizontal shaft 4 having connected with it an arm 5, from which is suspended a counterbalancing weight 6, by means of which construction the upper member may be readily raised and lowered by hand. The heat may be furnished in any suitable manner, as by the combustion of a mixture of air and gas, thus throwing upon the tire-ends, a blast of flame in the well known manner.

The muffle furnaces are movable in a circular path, the lower members being fixed to arms 7 supported from a central rotatable column 8, which in connection with the sustained parts, constitutes a rotatable supporting frame for the heating furnaces, the shafts 4 before alluded to being mounted in bearings in the corresponding supports 7 of the frame. The gas is conducted to the furnaces by suitable piping 9 for each furnace, branching out from a central supply pipe 10, the branches being arranged and connected up so as to rotate with the furnaces. Piping 10' is provided for the other of the combustion mediums, the two being mixed at the furnace by nozzles 11 in the well known manner. Cut-off valves are provided in the piping 9 and 10', and to these are connected actuating levers 12 and 13, which may be conveniently connected together by a rod or link 14, so that the air and gas may be cut off simultaneously.

In order that the tire may be properly supported with its ends between the two members of the furnace, and in such a position that it may be grasped by the clamping device, I provide a number of frames 18 supported by bracket plates 15 on the rotating furnace frame. The frames 18 comprise each a horizontal finger 19 to support the bottom of the tire, and engaging forks 17 at opposite sides, which receive and hold the tire loosely at these points with its disconnected ends between the furnace members. The furnace frame is rotated to present the tire successively in position to be grasped by the clamping device, by means of handles 8ª connected with the rotatable frame and projecting outwardly therefrom.

Means are provided for positioning and holding the rotating furnace frame so as to present the tires successively in position to be acted on by the clamping device. This means comprises a latch fixed to the end of a shaft 22 and adapted to engage the rotary frame at different points. The shaft carries an arm 21, to which a weight 20 is attached, and which acts to hold the latch in engagement with the rotary frame. The latch is operated to release the frame by means of a pedal lever 23 fixed to the shaft 22, and acting when depressed to disengage the latch from the frame and release the latter, whereupon the frame may be turned to proper position to present the next tire, after which the pedal lever being released, the latch will automatically act to again engage and hold the rotary frame in position.

The tire clamping and holding device Y before referred to acts to bring an approximately shaped tire into the exact size and exact circular predetermined form, and then rigidly holds it until the weld is completed. Said device operates to engage the tire automatically while supported by the frames 18, and after bending or bringing the tire to form, it is shifted in position and transfers the tire bodily to, and presents it to be operated on by, the welding or finishing device.

Figure 9:
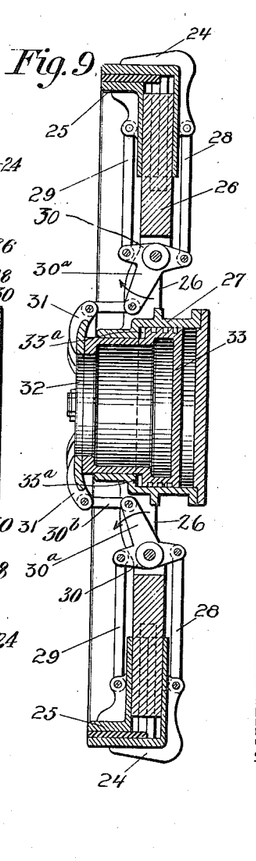
Fig. 9 is a section through the same on the line E—F of Fig. 7.

In its preferred form, the clamping and holding device comprises a series of pairs of jaws movable to and from each other and acting to forcibly clamp the tire between them at a number of points, which jaws are movable in radial lines and slidably mounted upon arms 26 carried by a hub 27, conveniently constructed in the form of a cylinder in order to furnish the power for operating the clamping jaws. The jaws are actuated by links 28 and 29 pivoted at their outer ends to the outer and inner jaws respectively, and at their inner ends to the opposite sides of a rocking plate or head 30 pivoted to the arm 26 and provided with an inwardly extending arm 30ª. The several arms 30ª have connected with them, one end of a series of horizontal links 30ᵇ whose opposite ends are fixed to brackets 31 connected in turn to the rim 32 of a hollow piston 33 mounted in the cylinder 27 before alluded to. From this description it will be seen that the movement of the piston outwardly in the cylinder, will rock the heads 31 in the direction of the arrows in Fig. 9, which action will shift the links 28 and 29 in opposite directions relatively, and cause the jaws 24 and 25 to close together, the opposite movement of the piston in the cylinder causing the jaws to separate from each other to open position. The piston is formed at its rear end with an enlargement which constitutes an annular shoulder 33ª within the cylinder and presenting a surface considerably less in area than the rear end of the piston, so that pressure acting against this surface will return the piston after it has been advanced by the pressure acting on the rear end of the same. The actuating pressure, preferably air, is admitted to the cylinder from a suitable source by a pipe 35, in which is applied a valve 34, from the casing of which pipes are extended to the cylinder, one at the rear of the piston and the other in front of the annular pressure surface 33ª. The valve is of such form that when in one position it will admit pressure to the rear end of the cylinder and open the pressure surface 33ª to exhaust, with the result that the piston will advance and close the clamping jaws. When the jaws are to be opened, the valve is shifted in position, its construction being such that it will then open the rear end of the cylinder to exhaust, and admit pressure in front of surface 33ª, which will act on the piston and return it to its former position in the cylinder, thereby opening the jaws.

It will be observed that the several coöperating jaws are arranged circumferentially at different points of a circle, and when they close, the meeting points of the jaws meet on a true circular line with the hub as a center. As a result of this construction, when the jaws close on the open ended tire, it brings or bends or springs the same to a predetermined fixed point, and holds the same to a true circle. Under these conditions there can be no variation in the size of the tires, or irregularity in the form.

In order that the clamping and holding device may be shifted, to transfer the heated tire from the furnace to the welding device Z, presently to be described, the hub 27 of the clamping device is mounted for axial rotation in a collar 64 fixed firmly to the forward ends of two links 42 pivoted at their opposite ends to a cross head 43 mounted slidingly on a horizontal cylinder 44 fixedly sustained by a frame 56, this head being also slidingly guided on two parallel bars 49 fixed at the opposite sides of the cylinder. The cross head has projecting from its rear side, two parallel bars 49 connected at their rear ends by a cross bar 48, to which is joined the rear end of a piston rod 47, extended forwardly through the rear end of the cylinder and connected therein to a piston 47a. As a result of this construction the movement of the piston forward within the cylinder, will shift the cross head 43 forwardly on the cylinder, thereby correspondingly shifting the tire clamping device to a position to grasp the tire supported at the furnace. The opposite movement of the piston will return the clamping device to its former position, which return movement of the clamps will effect the transfer of the heated tire to the welding device Z. In these movements of the parts back and forth, the links 42 pass through vertical slots in the frame 56, and rest and travel on rollers 63 mounted in the base of the slots. The movements of the piston in the cylinder are in the present instance effected by air under pressure supplied through pipe 35 connected by branch pipe 35a, with a valve casing 51, from which casing pipes 52 and 53 lead respectively to opposite ends of the cylinder, the said casing being provided with an exhaust opening 51a. A valve is mounted in the casing and contains the usual ports, adapted when the valve is in one position to admit the pressure to one side of the cylinder and open the opposite end of the exhaust, and when in another position, to admit the pressure to the other end of the cylinder and open the opposite end of the exhaust; whereby the piston will by the movement of the valve be caused to travel alternately in opposite directions. The valve has connected with it an operating arm 51b, to which the rear end of a horizontal rod 51c is jointed, having its opposite end connected to an operating lever 54. the oscillation of which will shift the valve in its casing and control the admission of pressure, as before described.

The welding or finishing device Z is sustained by the frame 56, and comprises as its essential features an anvil 40 and a hammer 41, the latter adapted to be operated to deliver a series of blows on the heated ends of the tire held on the anvil by the clamping device. The relation of the clamp-shifting-mechanism to the anvil and heating furnaces is such that when the clamping device reaches the end of its forward stroke, it will be in position to grasp the tire supported at the furnace, and when retracted and at the rear limit of its movement, it will occupy such position with reference to the anvil and hammer that the ends of the tire will be supported over the anvil and beneath the hammer.

Figure 6:
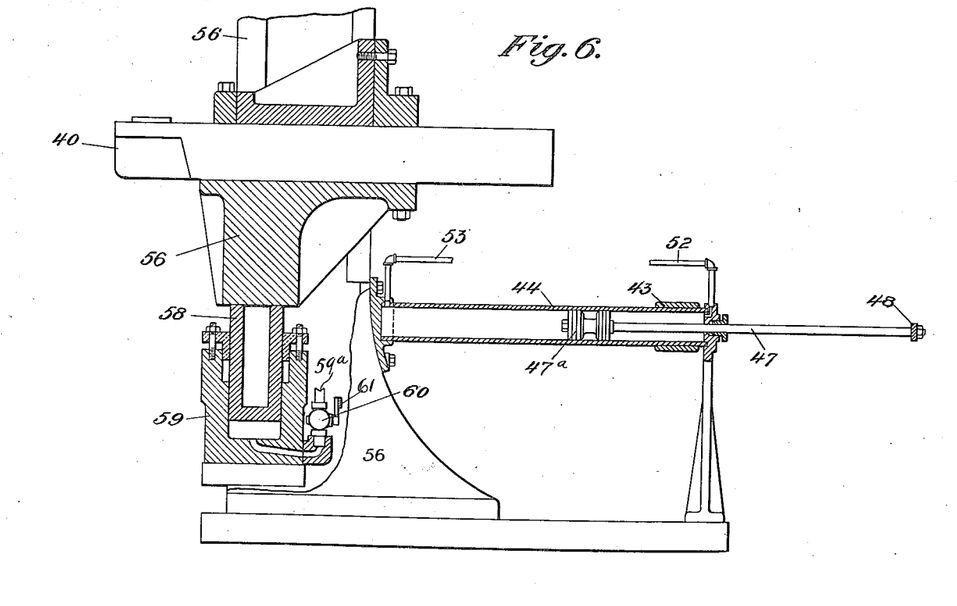
Fig. 6 is a vertical section on the line C—D of Fig. 4.
Figures 7, 8, 10:
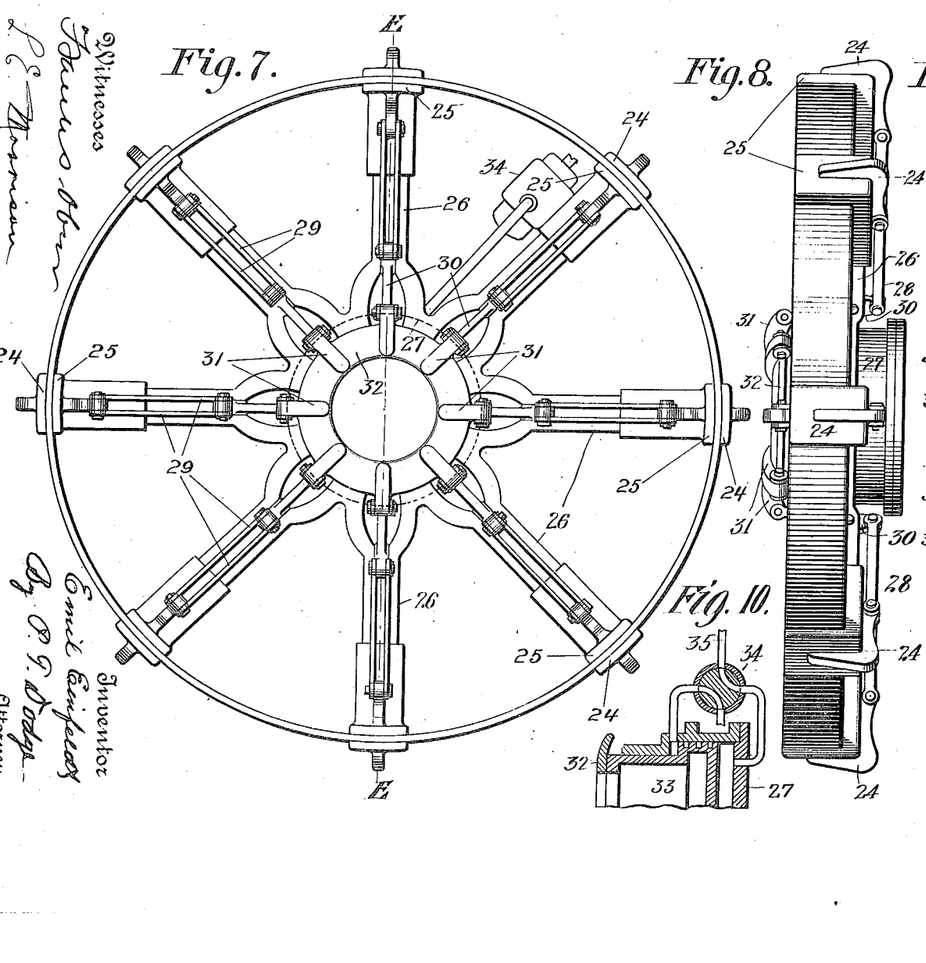
Fig. 7 is a front elevation of the tire-clamping and holding mechanism.
Fig. 8 is a side elevation of the same.
Fig. 10 is a sectional view of a portion of the cylinder and piston for actuating the tire clamping jaws and the valve and pipe connections for controlling the pressure thereto.

The hammer is driven in such manner that it will deliver positive blows of uniform length and force. The anvil, however, is so mounted that its relation to the hammer may be controlled by the operator, in such manner that the effect of the blows delivered by the hammer may be modified or varied. This is accomplished by providing for the vertical movement of the anvil, preferably by hydraulic pressure. As shown more particularly in Fig. 6, the anvil is provided with a ram or plunger 58 mounted in a vertical cylinder 59, sustained by the frame 56, fluid under pressure, preferably water, being admitted to the cylinder beneath the plunger so as to support the anvil, and so that by the control of the pressure the anvil may be raised and lowered. The fluid pressure may be admitted from a suitable source of supply, by pipe 59a, in which is applied a valve 60, operated by a lever 61, the form of the valve being such that the pressure admitted may be controlled to cause the anvil to rise by slow degrees or rapidly as desired. By this means the effect or force of the blows on the tire delivered by the hammer may be nicely controlled, the force of which blows cannot exceed the hydraulic pressure in cylinder 59. In the movements of the anvil up and down, it correspondingly moves the tire and the clamping device in which the latter is held, this movement of the clamping device being permitted by reason of the pivotal connection between the links 42 and cross head 43, as before described, the forward ends of the links during the vertical movements of the clamping device sliding up and down in the slots in the frame 56.

Figure 1:
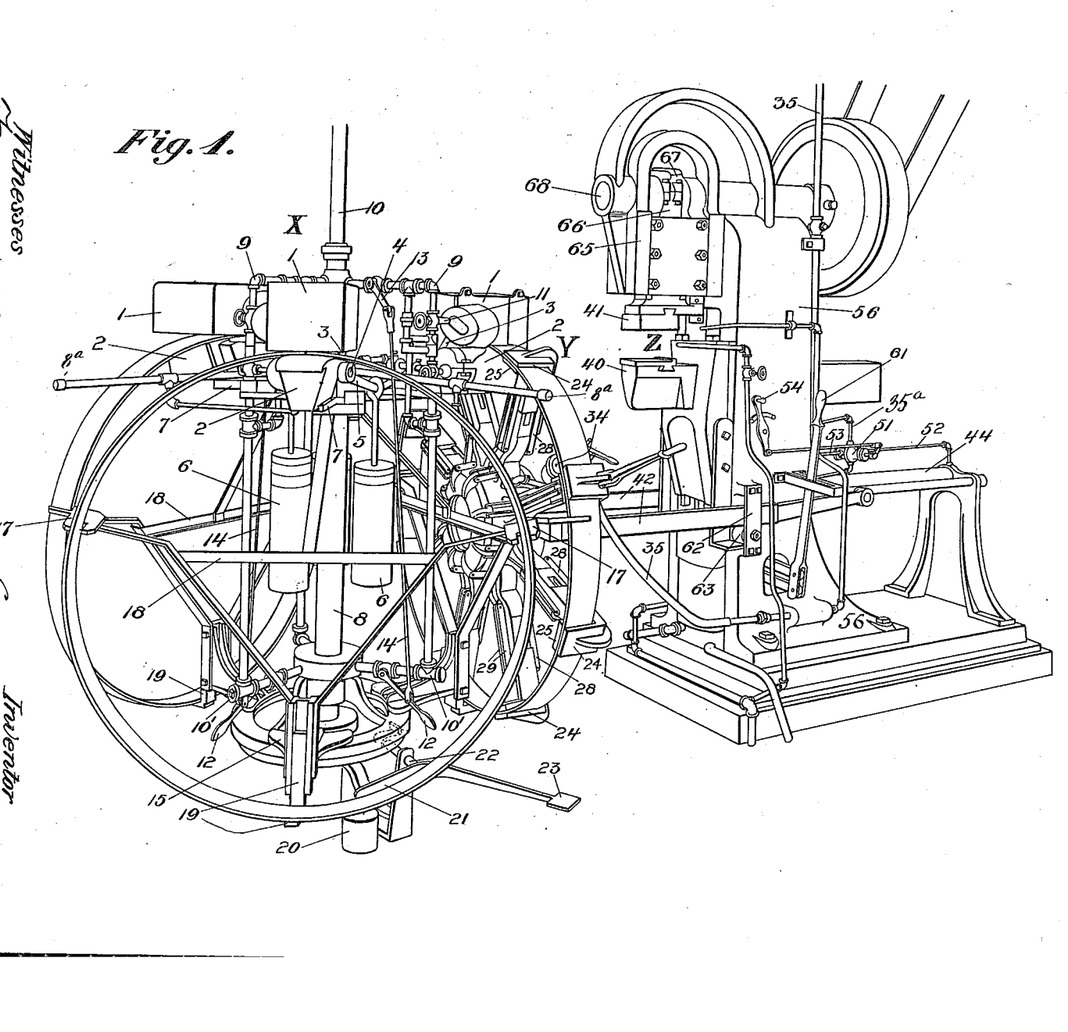
Figure 1 is a perspective view of a mechanism constructed in accordance with my invention, the clamping and holding means being shown as grasping the heated tire.
Figure 2:
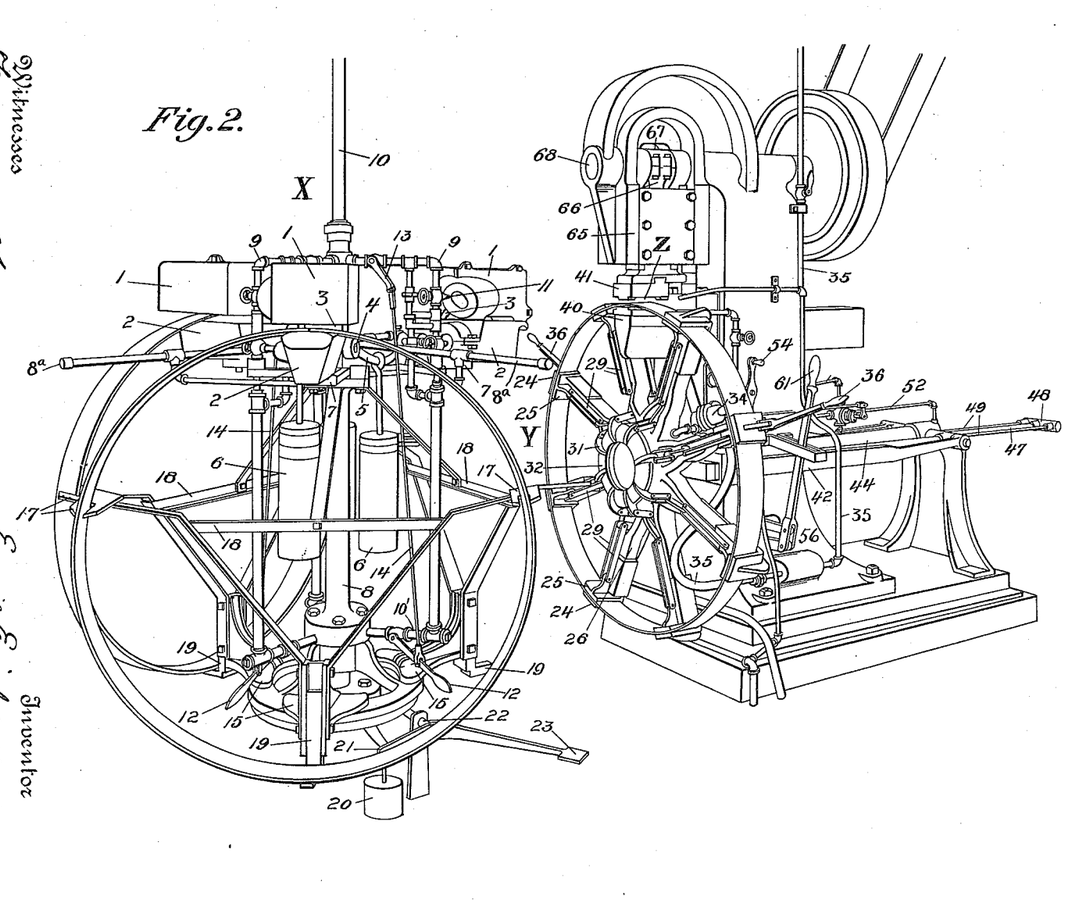
Fig. 2 is a similar view showing the tire held to be operated on by the welding or finishing mechanism.
Figure 3:
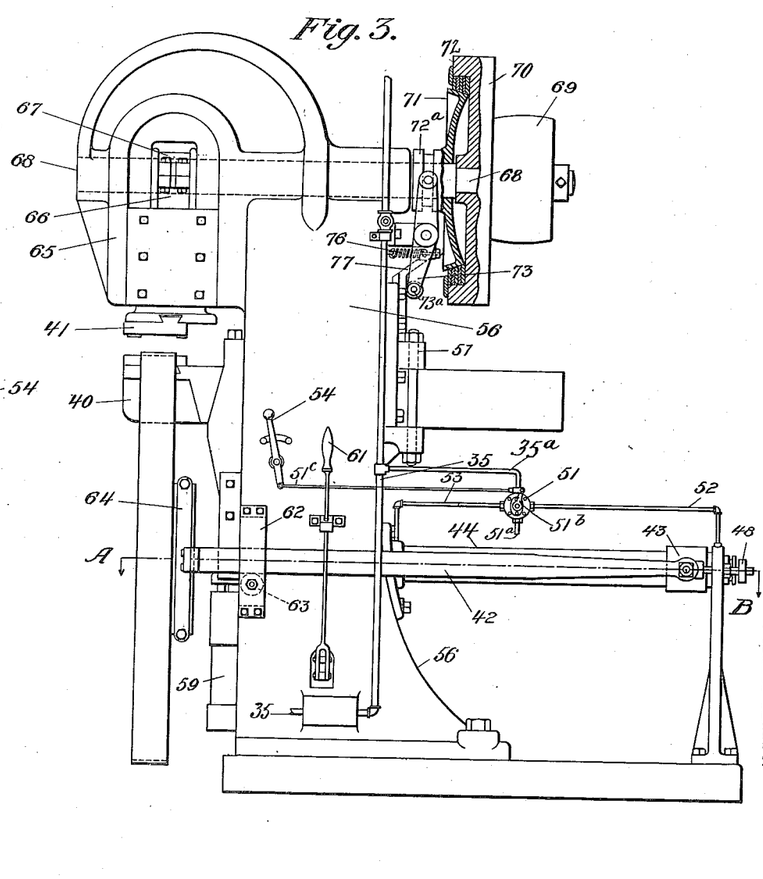
Fig. 3 is a side elevation of the welding mechanism and tire-shifting-device, the clamping device being omitted.
Figure 4:
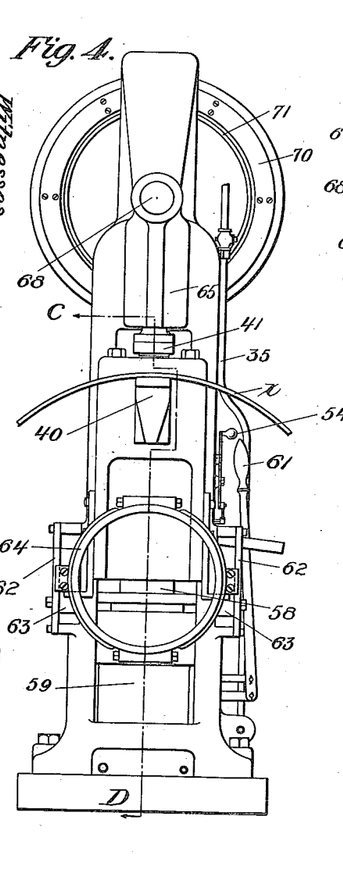
Fig. 4 is a front face view of the same.
Figure 5:
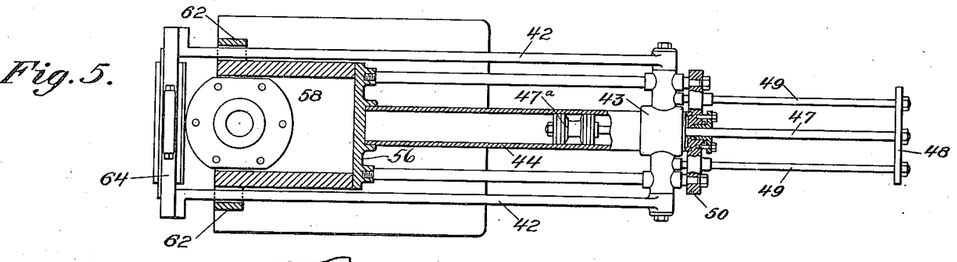
Fig. 5 is a horizontal sectional view on the line A—B of Fig. 3.

The hammer 41 is mounted to reciprocate in suitable ways in an arm 65 carried by the machine-frame 56. A connecting rod 66 joins the hammer to a crank 67 on a shaft 68, which is driven by suitable means, such as a pulley 69. Means for starting and stopping the operation of the hammer are provided, and in the present instance this is effected automatically by the operative connection of the hammer-operating mechanism with the anvil. As shown in Fig. 3, a clutch 70 is provided in the hammer-driving-mechanism, and consists of a clutch disk 72 rotatable with the pulley 69 which is loose on the shaft 68. A second clutch disk 71 is splined to the shaft 68, so that it may be moved into and out of engagement with the disk 72, and by this means effect a driving connection between the pulley 69 and the shaft 68. The disk 71 is provided with a grooved collar 72ª, embraced by a yoked lever 73 pivotally mounted on the machine frame, and carrying at its end a roller 73ª. A spring 76 is connected at one end of the frame, and at its other end to the lever 73, and tends to hold the lever in such position that the clutch disks will be connected.

A cam arm 77 is carried by the anvil, and is so formed and positioned that when the anvil is in lowered position, the cam arm will engage and hold lever 73 with the clutch disks disengaged, the elevation of the anvil causing the cam arm to release the lever 73, and permitting the spring to throw the clutch into action. In this way the operation of the hammer is automatically started when the anvil begins to rise, and is automatically stopped when the anvil approaches the limit of its downward movement.

The operation of the mechanism is as follows: The open ended tires are placed in the tire supporting frames 18, the upper members of the furnace being elevated to admit the ends of the tire. The rotating frame supporting the furnaces and tires is then rotated and the tires are successively brought to position to be grasped by the clamping device. The operator, by means of the lever 54 causes the clamping device, with its jaws opened, to advance, until the jaws are on each side of the tire. Valve 34 is then actuated to close the jaws, and the two jaws of each pair close down forcibly upon the tire and bring it to the exact predetermined size and shape desired and firmly hold it in this position. The operator now actuates lever 54 to retract the clamping device, which as it reaches the limit of its shifting movement to the rear, will bring the heated ends of the tire over the anvil, as shown in Fig. 3. By means of the lever 61, the anvil is caused to rise, the clutch being thrown into action and causing the hammer 41 to begin its operation, the continued rise of the anvil carrying the ends of the tire into contact with the hammer to effect the weld. The lever 61 may then be moved to and fro so as to vary to great nicety the position of the tire ends with respect to the hammer 41, as the shaping and finishing of the weld proceeds. At the same time the clamping device may be shifted axially by the rotation of the hub 27 in the collar 64 to change the position of the weld under the hammer. When the weld has been completed, the anvil is lowered, which will act to stop the operation of the hammer, and the valve 34 being operated to open the jaws, the finished tire will be released and may be removed from the machine. In its operation the hammer strikes regular and positive blows, and as the anvil begins its ascent, the tire lies beyond the range of movement of the hammer. When the operator actuates the lever 61 further, the anvil moves upwardly and brings the tire within the range of impact of the hammer, the force of the blows on the tire being governed by moving the lever backward and forward so as to cause the anvil to move up and down to a greater or less extent, and rapidly, or by slow degrees as desired. Either a lap weld or butt weld may be effected by the mechanism described. In the case of a lap weld, the ends of the tire strip are free to slide upon each other until the tire is brought to the exact size and shape, and are then held in position until finally finished under the hammer. Where a butt weld is to be effected, one manner of procedure is to use a strip slightly longer than the circumference of the finished tire, and to place the same in the heating furnace with the ends abutting. The clamping device, in engaging the tire and in closing on the same, will act to bring it to the required size, which will cause the heated ends to be upset and welded into each other, and without the aid of the hammer, except to shape or finish the weld.

From the foregoing description it will be understood that a machine has been disclosed embodying in one form, the principles of my invention. I desire it to be understood that the invention is not limited to any specific form or arrangement of the parts, except in so far as such limitations are specified in the claims.

Having thus described my invention, what I claim is:

1. A mechanism of the type described including in combination, heating means, means for holding the tire with its ends in position to be heated thereby, and means for bringing the tire to true circular shape and to the desired size while the ends are so heated.

2. A mechanism of the type described including in combination, heating means, tire finishing means, means for bringing the tire to true circular shape and to the desired size, and means for presenting the tire to the finishing means to be operated upon while it is still so held to shape and size.

3. A mechanism of the type described including in combination means for heating the contiguous ends of an approximately shaped tire, means for engaging the tire at a plurality of points along its circumference and moving it to proper size and shape and then holding it firmly, and means for finishing the ends while so held.

4. A mechanism of the type described including in combination, means for engaging an approximately shaped tire strip on the inside and outside thereof at a plurality of points and moving these points into a substantially true circle of a given size, and then holding the tire firmly to said shape and size, and means for uniting the ends of the tire while so held.

5. A mechanism of the type described including in combination, a series of tire heating means movable in an endless path, means for finishing a tire joint, means for stopping each heating means successively contiguous to said finishing means, and means for transferring the tire thereto from said heating means.

6. A mechanism of the type described including in combination, a plurality of tire heating means, means for finishing the tire joint, and means for removing a tire from each of said heating means and transferring it into operative relation with said finishing means.

7. A mechanism of the type described including in combination means for finishing the tire joint, a series of tire heating means movable successively into position contiguous to said tire-joint finishing means, and means for transferring a tire from the contiguous heating means into operative relation with the finishing means.

8. A mechanism of the type described including in combination heating means, tire finishing means, means for holding a tire blank to true circular shape and to the desired size, and means for shifting the tire while held by said holding means and while being operated upon by said finishing means.

9. A mechanism of the type described including in combination, heating means, means for holding a tire with its ends in position to be heated thereby, means for finishing the tire joint, and means for transferring the tire from the heating means to the finishing means, and for firmly holding it while being operated upon by the finishing means.

10. A mechanism of the type described including in combination, a plurality of tire heating means, means for finishing the tire joint, means for removing a tire from each of said heating means in succession and transferring it to said finishing means, and means for controlling the action of the finishing means upon the tire.

11. A mechanism of the type described including in combination, means for holding a tire strip to true circular shape and size, heating means, finishing means, and means for causing relative movement of said means, to permit the tire to be operated on by the heating means and finishing means in succession while held by said holding means.

12. A mechanism of the type described including in combination, a plurality of devices for engaging an approximately shaped tire at different and separated points and movable radially to bring the tire to proper predetermined size and shape.

13. A mechanism of the type described including in combination, a plurality of devices for engaging a shaped tire at different and separated points and movable radially to bring the tire to proper size and shape, and for firmly holding it in position, and means for fastening the ends of the tire together while it is so held.

14. In a mechanism of the type described, the combination of a series of clamping devices movable radially to engage the tire strip at a plurality of separated points on the inside and outside about its circumference and operating to bring it to proper size and shape, and power means under the control of an operator for shifting said series of devices while holding the tire.

15. A mechanism of the type described including in combination, means for heating the ends of a tire, tire finishing means, and power-actuated means movable between the heating means and finishing means to transfer the tires from the heating to the finishing means.

16. A mechanism of the type described including in combination, means for heating the ends of the tire, means for engaging the tire and conveying it from the heating means, and means for holding the tire in position to be heated by the heating means and to be engaged by said engaging and conveying means.

17. A mechanism of the type described including in combination, means for heating the ends of the tire, conveying means for the tire, and means for holding the tire with the ends in position to be heated by the heating means and to be engaged by said conveying means.

18. A mechanism of the type described including in combination, means for holding an approximately shaped tire, means for engaging the tire while so held and bringing it into true circular form and holding it firmly in such form, means for heating the tire joint, and means for finishing the tire joint.

19. A mechanism of the type described including in combination, heating means, joint finishing means, means for holding the approximately formed tire with its disconnected ends in position to be heated, means for bringing the tire to shape and size and holding it so, and means for transferring the tire while so held to the joint finishing means.

20. A mechanism of the type described including in combination, a tire finishing device comprising two members relatively movable with respect to each other to finish the tire joint, and means for firmly holding the tire to shape and size, said holding means being movable with one of the members of the tire finishing device.

21. A mechanism of the type described including in combination, heating means, joint finishing means comprising two members, one of said members being movable to and from the other, means for firmly holding the tire, means for transferring the tire from the heating means to the joint finishing means, said holding means being movable with said movable member of the joint finishing means.

22. A mechanism of the type described including in combination, tire holding means comprising a series of circumferentially arranged clamps comprising each two jaws movable toward each other to a clamping position at the circumference of a common circle with the other jaws of the series, means for so moving the jaws, and a holder for holding an approximately shaped tire strip in such position that one jaw of each clamp will come within, and the other jaw without the tire strip, and means for causing relative movement between the forming means and the holder.

23. A mechanism of the type described including in combination, heating means, a holder to hold the tire with its ends in operative relation with the heating means, means for finishing the tire joint, and a series of radially acting clamps for engaging the tire on the inside and on the outside at a plurality of points, and means for moving the clamps into operative relation with said finishing means.

24. A mechanism of the type described including in combination, heating means, a holder to hold the tire with its ends in operative relation with the heating means, means for finishing the tire joint, and a series of radially acting clamps for engaging the tire on the inside and on the outside at a plurality of points, means for moving the clamps into operative relation with said finishing means, the said clamps acting to hold the tire firmly while being operated on by the finishing means.

25. In a mechanism of the type described, the combination with means for heating the ends of the tire blank, of mechanism adapted to grasp the heated tire and acting to bring the same to true circular predetermined form.

26. In a mechanism of the type described, the combination with means for heating the ends of the tire blank, of a welding device, a clamping mechanism acting to grasp the heated tire and shape it to predetermined form and size, and means for shifting the clamping mechanism to transfer the tire to the welding device.

In testimony whereof I hereunto set my hand this 3rd of June, 1909, in the presence of two attesting witnesses.

EMIL EINFELDT.

Witnesses:
ANDREW NEILSON,
LEON ZOECKLER.